Patented July 19, 1949

2,476,944

UNITED STATES PATENT OFFICE 2,476,944

2-SULFANILAMIDO-4-THIAZOLONES

Maurice L. Moore and James M. Sprague, Drexel Hill, Pa., assignors to Sharp & Dohme, Incorporated, Philadelphia, Pa., a corporation of Maryland No Drawing. Application January 15, 1941, Serial No. 374,457

9 Claims. (Cl. 260—239.6)

This invention relates to new heterocyclic derivatives of sulfanilamide in which a heterocyclic radical is linked to the sulfonamido group, and more particularly to such derivatives in which the heterocyclic grouping is derived from thiazolone heterocyclic groupings.

The new products of this invention are therapeutically useful particularly in combatting bacterial infections such as coccus infections, such as streptococcus and especially pneumococcus, and other infections.

The products of the invention may be represented by the general formula $M \cdot Ar \cdot SO_2NRY$, in which M may be hydrogen, a nitro, amino, or acylamino group, and Ar represents an aryl radical such as phenyl, tolyl, xylyl and the like, and R may be hydrogen or an alkyl radical, saturated or unsaturated, for example, methyl, ethyl, propyl, butyl, amyl, allyl, hexyl, heptyl, octyl and the like, or decyl, dodecyl, hexadecyl, and the like, and Y is a heterocyclic radical attached to the sulfonamido nitrogen and selected from the group consisting of the thiazolonyl and nuclear substituted thiazolonyl groups.

The nuclear substituent of the thiazolonyl group may be a hydrocarbon radical such as a saturated or unsaturated alkyl radical, straight chain or cyclic, mono- or di-substituent, for example, methyl, di-methyl, ethyl, di-ethyl, propyl, butyl, amyl, allyl, cyclo-amyl and -hexyl, cyclopentenyl and the like, or an aryl radical such as phenyl, tolyl, naphthyl, or aralkyl radical as benzyl and the like, or may be an alkoxy radical such as methoxy, ethoxy, propoxy, and the like.

In the various cases in which R may be either hydrogen or an alkyl radical, M may be either hydrogen, a nitro, an amino, or an acylamino radical, such as the butyryl-, valeryl-, caproyl-, heptoyl-, and octoylamino radicals and the like, and Y may be either a non-substituted or substituted thiazolonyl group.

The products of this invention in which M of the general structural formula is a nitro or acylamino group while R is hydrogen are generally prepared by condensing an amino derivative of thiazolone or of the nuclear substituted thiazolone (having the particular structure which it is desired to introduce into the end product) with, for example, either a nitro- or acylamino-arylsulfonyl halide, e. g., o- or p-nitrobenzenesulfonyl chloride or p-acetylaminobenzenesulfonyl chloride, and splitting off hydrogen halide, the reaction being carried out in a suitable solvent such as pyridine.

The corresponding products in which M is an amino group are obtained either by reducing, preferably by catalytic reduction, the above described nitro compound having R as hydrogen, or by hydrolyzing the described corresponding acylamino compound.

To prepare the product in which R of the general structural formula is an alkyl group and M is a nitro or acylamino group, the nitro- or acylamino-arylsulfonamido heterocyclic compound above described in which R of the general formula is hydrogen is alkylated by reaction with a suitable alkylating agent such as an alkyl halide, as methyl chloride or bromide or ethyl chloride or bromide, or an alkyl sulfate as diethyl sulfate, or an alkyl sulfonate, and the like, to replace the hydrogen represented by R by the desired alkyl radical. The desired end product in which R is alkyl and M is amino is obtained by reducing the corresponding nitroarylsulfonyl-alkylamido heterocyclic compound or hydrolyzing the corresponding acylamino-arylsulfonyl-alkylamido heterocyclic derivative. The alkylation of the acylamino-arylsulfonamido thiazolonyl compound is advantageously carried out by dissolving such starting material in dilute aqueous sodium hydroxide and alkylating by shaking with a slight excess of the selected alkylating agent such as dimethyl sulfate. The alkylation may be carried out similarly with the nitro-arylsulfonamido thiazolonyl starting material. Thus there is obtained the (acetylaminoarylsulfonylmethylamino)- or the corresponding (nitroarylsulfonylmethylamino)-4-thiazolonyl product, the acetyl derivative yielding upon hydrolysis and the nitro derivative yielding upon reduction the corresponding (aminoarylsulfonylmethylamino)-4-thiazolonyl derivative. If the dimethyl sulfate is replaced by diethyl sulfate, the corresponding acylamino- or nitro-arylsulfonylethylamino thiazolonyl derivative is obtained, the acetylamino product yielding on subsequent hydrolysis, and the nitro derivative yielding upon subsequent reduction, the (aminophenylsulfonylethylamino)-4-thiazolonyl product.

The invention may be illustrated by, but not restricted to, the following examples:

*Example 1.*—*2-(sulfanilamido)-5-ethyl-4-thiazolone.*—15 gms. (0.07 mol, 10% excess) of 2-amino-5-ethyl-4-thiazolone hydrobromide are dissolved in 50 cc. of pyridine and 15 gms. (0.064 mol) of p-acetamidobenzenesulfonyl chloride added slowly with stirring. The mixture warms up spontaneously and stirring is continued until it returns to room temperature. The intermediate, 2-(acetamidobenzenesulfonamido)-5-ethyl- 4-thiazolone, is obtained as a yellow oil, which readily solidifies, upon pouring into a large volume of cold dilute hydrochloric acid. Recrystallized from dilute alcohol this intermediate melts at 200.5–201.5° C. 7.3 gms. of this intermediate are suspended in 70 cc. of dilute hydrochloric acid (1:6) and heated on the steam-bath and for one-half hour after complete solution results. Upon cooling, the hydrochloride of the amino compound separates. The free base is isolated by neutralizing with ammonium hydroxide. Yield 4.1 gms. Upon purification by recrystallizing from dilute alcohol, it melts at 184.5–186°

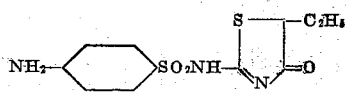

*Example 2.—2-sulfanilamido-4-thiazolone.—* 15 gms. of 2-amino-4-thiazolone are suspended in 200 cc. of anhydrous pyridine and heated almost to reflux. 27.2 gms. of p-acetylamidobenzenesulfonyl chloride are added slowly with stirring over a period of fifteen to thirty minutes by which time solution is complete. The pyridine is removed by distillation under reduced pressure on the steam-bath and the residual syrupy product is triturated with 25 cc. of water. Then the water is also removed under reduced pressure and the now remaining product is triturated with 100 cc. of hydrochloric acid solution (1:2). A solid is obtained which after being removed by filtering, is washed with water and hydrolyzed by refluxing with hydrochloric acid solution. The 2-sulfanilamido-4-thiazolone thus obtained is purified by crystallization from a mixture of methyl cellosolve and water, melting at 235–235.5° C. with decomposition.

If instead of starting with 2-amino-4-thiazolone in the process of example 2, one uses as the starting material a 2-amino-5-alkyl-4-thiazolone or a 2-amino-5,5-dialkyl-4-thiazolone, the corresponding acetylsulfanilamido-5-alkyl- and -5,5-dialkyl-4-thiazolones are obtained and these upon subsequent hydrolysis in the manner of the example yield the corresponding sulfanilamido-5-alkyl- and -5,5-dialkyl-4-thiazolones, as illustrated by the examples in the following table, in which the first column shows the 2-amino-5-(mono- or di-) alkyl-4-thiazolone starting material, the second column shows the melting point of the intermediate 2-acetylsulfanilamido-5-(mono- or di-)alkyl-4-thiazolone, and the third column shows the melting point of the 2-sulfanilamido-5-(mono- or di-)alkyl-4-thiazolones obtained upon the hydrolysis of the corresponding intermediate acetyl derivative:

| Amino-4-thiazolone starting materials | 2-(acetylsulfanilamido)-alkyl-thiazolone intermediates, M. Pt., °C. | 2-sulfanilamido-alkyl thiazolone products M. Pt. °C. |
|---|---|---|
| 2-amino-5-methyl- | 244–245 | 167–168 |
| 2-amino-5-ethyl- | 200.5–201.5 | 184.5–186 |
| 2-amino-5-propyl- | 187–188 | 160–161 |
| 2-amino-5-butyl- | 184–185 | 206.5–207.5 |
| 2-amino-5-amyl- | 190–191 | 167–168 |
| 2-amino-5-cetyl- | 130–143 | 129–130 |
| 2-amino-5,5-diethyl- | 210–212 | 198–199 |
| 2-amino-5,5-dimethyl- | 247–248 | 210–211 |

*Example 3.—2-N⁴-hexanoylsulfanilamido-5-ethyl-4-thiazolone.*—10 gms. of 2-amino-5-ethyl-4-thiazolone are suspended in 50 cc. of anhydrous pyridine and treated with 26.5 gms. of p-hexanamidobenzenesulfonyl chloride. The solution is stirred until the heat of reaction subsides to room temperature and is then poured into 300 cc. of hydrochloric acid solution (1:2). The taffy-like product is triturated with cold water until a more dense solid is obtained, which upon being purified by crystallization from alcohol and water, melts at 174–175° C.

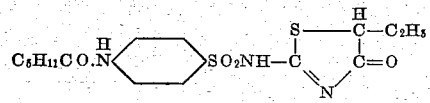

By starting with the corresponding p-acyl-, such as propionyl-, butyryl-, valeryl-, heptoyl- and octoyl - aminobenzenesulfonyl chloride in place of the corresponding acylaminobenzenesulfonyl chloride of Example 2 or Example 3, corresponding 2-(p - acylaminobenzenesulfonamido) - 4-thiazolones and corresponding 2-(p-acylaminobenzenesulfonamido) - 5 - alkyl - 4 - thiazolones are obtained, which upon hydrolysis in the manner indicated in Example 2 or 3 yields the corresponding 2 - sulfanilamido - 4 - thiazolones and the corresponding 2 - sulfanilamido - 5 - alkyl-4-thiazolones, e. g. 2-N⁴-hexanoylsulfanilamido-5-butyl-4-thiazolone melting at 134–135° C., 2-N⁴ - heptanoylsulfanilamido - 5 - ethyl - 4 - thiazolone melting at 140–141° C., and 2-N⁴-heptanoylsulfanilamido-5-butyl-thiazolone melting at 139–140° C.

*Example 4.—2-(o-nitrobenzenesulfonamido)-4-thiazolone.*—By condensing o-nitrobenzenesulfonyl chloride with 2-amino-4-thiazolone in a procedure substantially following that of Example 2, there is obtained 2-(o-nitrobenzenesulfonamido)-4-thiazolone.

In a manner similar to that indicated in Example 4 and starting with p-nitrobenzenesulfonyl chloride, there is obtained 2-(p-nitrobenzenesulfonamido)-4-thiazolone.

If the 2-amino-4-thiazolone of Example 4 is replaced by a 2-amino-5-alkyl(mono- or di-alkyl)-4-thiazolone, there is obtained the corresponding 2 - (o-nitrobenzenesulfonamido) - 5 - alkyl - 4-thiazolone and 2-(p-nitrobenzenesulfonamido) - 5-alkyl-4-thiazolone, in each of which the 5-alkyl may be either mono- or di-alkyl such as the 5-methyl-, 5-ethyl-, 5-butyl-, 5-cetyl-, 5-diethyl-, or 5-di-methyl-4-thiazolone, including among others 2-(p-nitrobenzenesulfonamido)-5-ethyl-4-thiazolone melting at 192–193° C. and 2-(p - nitrobenzenesulfonamido) - 5 - butyl - 4 - thiazolone melting at 186–187° C.

The arylsulfonamido-4-thiazolonyl compounds, that is, those in which M of the general formula is H may be prepared substantially by the procedure described in Examples 2 and 3 by replacing the p-acylaminobenzenesulfonyl chloride of those examples by an arylsulfonyl chloride such as phenyl sulfonyl chloride or tolylsulfonyl chloride and reacting it with 2-amino-4-thiazolone or a 2-amino-5-alkyl-4-thiazolone in which the 5-alkyl may be mono- or di-alkyl as exemplified in the preceding paragraph, yielding the corresponding arylsulfonamido-4-thiazolones and arylsulfonamido-5 - alkyl - 4 - thiazolones, including among others 2 - benzenesulfonamido - 5 - ethyl - 4-thiazolone, and 2-toluene-sulfonamido-5-ethyl-4-thiazolone which melts at 139–140° C.

The acylaminoarylsulfonamido thiazolones may also be prepared by reacting an acylaminoarylsulfon(haloacyl)amide with a thiocyanate such as an alkali metal thiocyanate as potassium or sodium thiocyanate preferably in a solvent such as ethanol. The corresponding aminoarylsulfonamido-4-thiazolones are obtained by hydrolyzing any of the acylaminoarylsulfonamido thiazolone derivatives, preferably in acid solution such as hydrochloric acid. In either of the preceding groups of compounds, the thiazolonyl nucleus may be unsubstituted or substituted in which latter case, for example, an alkyl group or di-alkyl groups of the scope hereinabove described may be linked in the 5-position. This method may be illustrated by, but not restricted to, the following examples:

*Example 5.—2-sulfanilamido-4-thiazolone.—* 15.85 gms. of $N^4$-acetyl-$N^1$-chloroacetylsulfanilamide are mixed with 6.34 gms. of potassium thiocyanate in 235 cc. of ethanol and refluxed for four hours. At the end of this time, the condenser is removed and heating continued for another hour. The solution is diluted to about 800 cc. with water and 2-acetylsulfanilamido-4-thiazolone is obtained as a crystalline solid after cooling overnight. This material is recrystallized from a mixture of methyl Cellosolve and water, M. P. 264–266° C. with decomposition.

The above product, 12.04 gms., is suspended in 90 cc. of hydrochloric acid solution (1:6) and 15 cc. of ethanol and refluxed until solution is complete. 2-sulfanilamido-4-thiazolone is obtained as a crystalline solid by decolorizing the solution with "Norite" and cooling. Upon recrystallization from a mixture of methyl Cellosolve and water, the product melts at 235–235.5° C. with decomposition.

*Example 6.—2-sulfanilamido-5-ethyl-4-thiazolone,* M. Pt. 184–5–186° C., has been prepared according to the procedure of Example 5 by substituting $N^4$-acetyl-$N^1$-alpha-chlorobutyrylsulfanilamide for the corresponding initial material in Example 5.

The 2-acetylaminoarylsulfonylalkylamido derivatives corresponding to the 2-$N^4$-acetylsulfanilamido-4-thiazolone and to the 2-$N^4$-acetylsulfanilamido-5-ethyl-4-thiazolone of Examples 5 and 6 may be prepared by alkylating these 2-$N^4$-acetyl-sulfanilamido thiazolones in the manner similar to that described hereinabove for the preparation of the products in which R of the general structural formula is an alkyl group while M is a nitro or acylamino group, thereby yielding a 2-(p-acylaminoarylsulfonylalkylamino)-4-thiazolone such as 2-(p-acetylaminophenylsulfonylethylamino)-4-thiazolone and a 2-(p-acylaminoarylsulfonylalkylamino)-5-alkyl-4-thiazolone such as 2-(p-acetylaminophenylsulfonylethylamino)-5-ethyl-4-thiazolone, from which the corresponding $N^4$-unsubstituted-amino compounds can be obtained by hydrolysis of the just described $N^4$-acetylamino compounds.

Concerning any of the products in which R of the general structural formula is an alkyl group while M is an acylamino group, by starting with the corresponding 2-(p-acyl, such as propionyl-, butyryl-, valeryl-, heptoyl-, and octoyl-aminoarylsulfonamido)-4-thiazolone or -5-alkyl-4-thiazolone and alkylating with either dimethyl or diethyl sulfate, the corresponding acylaminoarylsulfonylalkylamino thiazolonyl product is obtained, which on hydrolysis yields the corresponding 2-(p-aminoarylsulfonylmethyl- or ethylamino)-4-thiazolone or -5-alkyl-4-thiazolone.

The arylsulfonamido-4-thiazolones and arylsulfonamido-5-alkyl-4-thiazolones may also be converted to the corresponding arylsulfonylalkylamido derivatives thereof by alkylating in the manner hereinabove described, giving, for example 2-benzenesulfonylethylamido-4-thiazolone and 2-benzenesulfonylethylamido-5-ethyl-4-thiazolone.

While the thiazolone nucleus, insofar as the oxygen linked to the carbon atom in the 4-position is concerned, is represented in the structural formulae illustrating the compounds, as in Examples 1 and 3, with that carbon atom and the oxygen appearing as a carbonyl group, the 4-thiazolone nucleus may be considered as possibly having two tautomeric forms. One of these is the carbonyl form as shown in Examples 1 and 3. The other, involving a shifting of the bonds of the thiazolone nucleus with change from the carbonyl form to the enol form, may possibly occur. Accordingly, the term "thiazolones" and "thiazolone" (as the latter is used in the expression "a . . . thiazolone") and the expression "a thioazolonyl" herein and in the appending claims includes both of the tautomeric forms of the thiazolone nucleus as well as the thiazolone nucleus with substituents linked to its carbon atom in the 5-position.

The general description of the invention and the examples show that the therapeutically useful products of the invention are not limited to those above specifically illustrated and identified. It is seen that the desired products covered by the invention according to the illustrated general formula may structurally be considered as consisting of three essential portions, one being broadly the arylsulfonyl or acyl-, nitro- or amino-benzene-sulfonyl portion, another being the thiazolonyl or nuclear substituted thiazolonyl portion, and these two being linked to the nitrogen atom of the middle portion which is an imino radical. The combination of these three essential portions gives the basic structure of any compound of the type contemplated, and it is readily seen that variations in substituents replacing any of the hydrogen atoms on any one or more than one of these three basic portions will yield different individual compounds embraced within the scope of the invention.

Thus it is seen that if Y in the general structural formula is simply the thiazolone radical and R is hydrogen, one compound results when M is an amino group in the para position to the sulfonyl radical; another is obtained when M is a nitro group in the same para position and still another when M is a nitro group in the ortho position; still another when M is the caproylamino group. Still further additional individual compounds are obtained if the caproyl radical in the compound just last referred to is replaced by another suitable acyl radical in which case the term "acyl" is intended to designate broadly the monovalent radical resulting when the hydroxyl group of the carboxylic radical is removed from the molecule of a carboxylic acid.

Thus the just above referred to acyl radical may be saturated or unsaturated alkyl, aryl, aralkyl, alicyclic or heterocyclic, or substituted or unsubstituted, as illustrated by butyric, isobutyric, valeric, isovaleric, active valeric, caproic, alpha chlorcaproic, heptoic, caprylic, capric, lauric, palmitic, oleic, stearic, ricinoleic, myristic, behinic, benzoic, phenylacetic, phenylchloracetic, phenylaminoacetic, aminobenzoic, phenylpropionic, nitrobenzoic, pyromucic, cinnamic, chlorbenzoic, sulfobenzoic, mandelic, toluic, hydratropic, toulacetic, tropic, furalacrylic, hexahydrobenzoic, cyclopentane carboxylic, nicotinic, and thiazole-4-carboxylic acids.

Other individual compounds are obtained when the aryl- or benzene-sulfonyl portion has a selected specific substituent of the type disclosed and the middle imino portion remains unsubstituted, but variations are made in the substituents linked to the thiazolone nucleus by selecting any of the nuclear substituents of the type hereinabove set forth. Still other individual compounds are possible by selecting a fixed benzenesulfonyl portion with a specific substituent for M of the general formula and selecting the thiazolonyl or a specific nuclear substituted thiazolonyl radical possible according to the disclosure and above description and replacing the hydrogen of the middle imino portion by any one of the saturated or unsaturated alkyl radicals.

Thus while variations in the general make-up of the products of the invention as just above indicated give the several products specifically identified hereinabove and also products such as 2 - (o- and p - nitrobenzene sulfonamido) - 5 - phenyl - 4 - thiazolone, 2 - (sulfanilamido) - 5 - phenyl-4-thiazolone, 2 - ($N^4$-hexanoyl sulfanilamido) - 5,5 - diethyl - 4 - thiazolone, 2-($N^4$-heptanoyl sulfanilamido) -5,5- diethyl-4-thiazolone, 2 - ($N^4$-hexanoylsulfanilamido) - 5 - ethoxy - 4 - thiazolone, 2-(o- and p-nitrophenylsulfonylethylamino)-5-ethyl-4-thiazolone, 2-sulfanilamido-5-unsaturated hydrocarbon substituent-4-thiazolones as 2-sulfanilamido-5-allyl-4-thiazolone, 2-sulfanilamido-5-cyclo-alkyl - 4 - thiazolones as 2-sulfanilamido-5-cyclo-hexenyl-4-thiazolone, 2-sulfanilamido-5-cyclo-hexyl-4-thiazolone, 2-sulfanilamido-5-aralkyl-4-thiazolones as 2-sulfanilamido-5-benzyl-4-thiazolone, a very large number of other specific individual compounds are possible by making variations of the type hereinabove disclosed in either the aryl- or benzenesulfonyl portion, the middle imino portion, or the end thiazolonyl portion, or in any one or two or all of the portions by substituents of the type set forth, all of which different specific individual compounds are included as a portion of this disclosure without listing separately their individual names all of which are readily apparent as each individual structure with the selected substituent or substituents is drawn.

The position of element M of the general structural formula is not restricted to para, for, as shown by Example 5, the nitro substituent represented by M may be made in the ortho position. Such nitro group in the ortho position in any compound embraced by the invention may, as pointed out above, be reduced to yield the corresponding compound of the invention, in which M is an amino group in the ortho position. Such amino group in the ortho position of any compound embraced by the invention can be readily converted to any of the desired acylamino radicals to yield a compound embraced by the invention and in which M is an acylamino radical in the ortho position.

In the specification and the claims, the term "thiazolonyl" has been used generically in many instances as may be readily noted from the surrounding language particularly when it is preceded by the article "a," to embrace the radical of the individual compound, thiazolone, as well as the radical of any homologues, isomers and nuclear substituents of the individual compound and of its homologues and isomers. In some instances in the specification and the claims the term "-4-thiazolones" has been used generically to embrace the same scope as just indicated with respect to the expression "thiazolonyl."

Also, in the specification and in the claims, in many instances the term "amino" has been used generically as may be readily noted from the surrounding language and by the use of the expression "an amino group" to embrace not only the unsubstituted amino radical, but also substituted amino radicals such as acylamino and alkylamino radicals.

This application is a continuation-in-part of our pending application Serial No. 287,936, filed August 2, 1939, now abandoned.

We claim:

1. A 2-(phenylsulfonamido)-4-thiazolone having the general formula M—$C_6H_4$—$SO_2NRY$, in which —$C_6H_4$— is the divalent phenylene radical; M is a member of the class consisting of hydrogen, o-nitro, p-nitro, p-amino, and p-acylamino groups; R is a member of the class consisting of hydrogen and an alkyl group; and Y is a thiazolonyl radical linked by its carbon atom in the 2-position to the sulfonamido nitrogen.

2. A 2-(phenylsulfonamido)-4-thiazolone, having an amino group linked to the phenyl radical and in position para to the sulfonyl group.

3. A 2-sulfanilamido-4-thiazolone, in which the thiazolonyl radical is alkyl-substituted in the 5-position.

4. A 2-sulfanilamido-4-thiazolone, is which the thiazolonyl radical is monoalkyl-substituted in the 5-position.

5. 2-sulfaniamido-5-butyl-4-thiazolone.

6. A 2-sulfanilamido-4-thiazolone, in which the thiazolonyl radical is dialkyl-substituted in the 5-position.

7. 2-sulfanilamido-5-ethyl-4-thiazolone.

8. 2-sulfanilamido-5,5-diethyl-4-thiazolone.

9. 2-sulfanilamido-4-thiazolones.

MAURICE L. MOORE.
JAMES M. SPRAGUE.

REFERENCES CITED

The following references are of record in the file of this patent:

UNITED STATES PATENTS

| Number | Name | Date |
| --- | --- | --- |
| 1,898,431 | Dressel | Feb. 21, 1933 |

OTHER REFERENCES

Journal Pharm. Soc. Japan, vol. 59, No. 3, pp. 204–15 (March 1939); ibid., vol. 59, No. 7, pp. 155–158 (July/Aug. 1939).

Biochemical Jour., vol. 31, No. 5, pp. 724–730 (May, 1937).

Gelmo: J. für prakt. Chemie, vol. 77, pp. 369–382 (1908).

Jour. Indian Chem. Soc., vol. 14, pp. 733–735 (1937).

Jour. Applied Chem. (U. S. S. R.), vol. 11, pp. 316–17 (1938).

Richter: "Organic Chemistry," vol. III, p. 117 (Blakeston Co., Phila., 1923).